Oct. 2, 1962 H. H. RENNEKER 3,056,862

TELEPHONE HAND SET SUPPORTS

Filed Feb. 1, 1961

INVENTOR.
HERMAN H. RENNEKER

BY Baldwin & Wight

ATTORNEYS

United States Patent Office 3,056,862

Patented Oct. 2, 1962

3,056,862
TELEPHONE HAND SET SUPPORTS

Herman H. Renneker, San Diego, Calif., assignor to H. H. Renneker Co., Inc., San Diego, Calif., a corporation of California Filed Feb. 1, 1961, Ser. No. 86,473
13 Claims. (Cl. 179—157)

This invention relates to telephone hand set supports, and more particularly to supporting devices having means for attachment to hand sets and a cradle or the like adapted to be rested upon a user's shoulder for comfortably supporting the telephone hand set instrument in proper position in relation to the user's ear and lips. In another sense, the invention relates to telephone hand set supports of the general character of those disclosed in my prior Patents No. 2,476,221 of July12, 1949 and No. 2,863,954 of December 9, 1958, the present invention, however, providing improvements, especially with respect to adjustment of the parts of the support for adapting it to be used comfortably and conveniently by different persons. The physiques of different telephone users vary over a wide range, some having much longer necks than others, and some simply being larger in all respects. Moreover, some users prefer a telephone instrument to be supported in a different position from others so as to require the user's head to be held at one angle or another, found to be the most comfortable to the individual.

A general object of the present invention is to provide a telephone hand set support of the class referred to which is so constructed as to have wider and more convenient adjustment characteristics, thus enabling the hand set support to be adjusted to achieve maximum convenience and comfort in use by different individuals.

Another object of the invention is to provide a telephone hand set support embodying these improvements and advantages, and which may be adjusted readily with a minimum susceptibility to confusion in making the adjustments, as for example in adapting the support for being rested upon the right or the left shoulder of a user, and for adapting the support to be suited to a positioning of the head preferred by a particular individual.

Other objects of the invention will become apparent from a reading of the following description of a preferred embodiment, the appended claims and the accompanying drawings in which:

Figures 1, 2, 3, 4, 5:
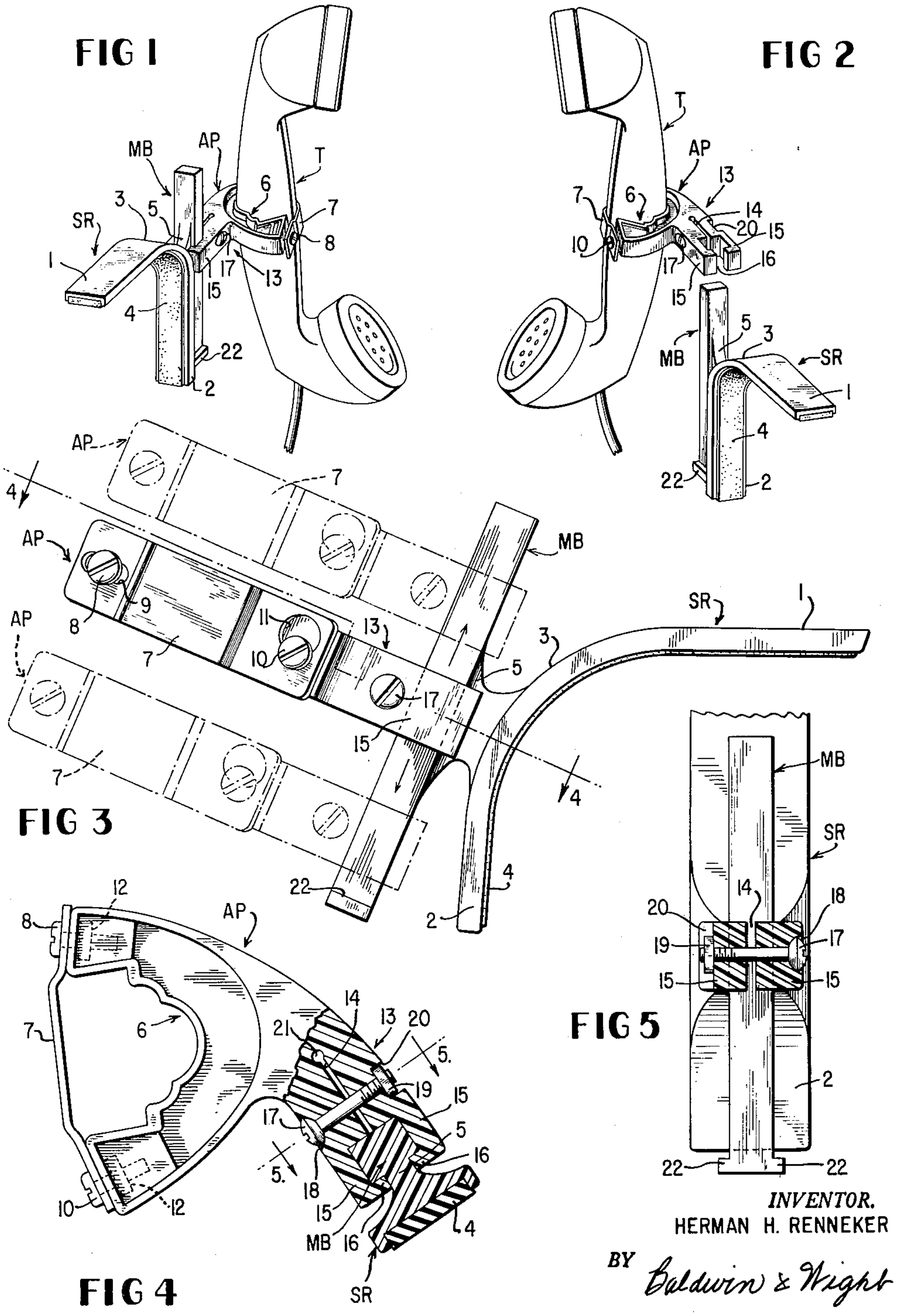
FIGURE 1 is a perspective view of a telephone hand set support connected to a telephone hand set in a manner to provide for being supported upon the user's left shoulder.
FIGURE 2 is a perspective view showing the relative positions of the parts for being assembled in adapting the support and hand set for being rested upon the user's right shoulder, a hand set attaching part being shown slightly separated from a shoulder rest part for further illustration of certain details.

FIGURE 3 is an elevation of the hand set support assembled for right shoulder use, the hand set attaching part being shown in full lines in what may be considered an average position of adjustment on the shoulder rest part, and being shown in dot-dash lines in two alternate positions of adjustment, for example for relatively high and relatively low positioning of the telephone instrument, according to the user's physique or preference;

FIGURE 4 is a section on the line 4—4 of FIGURE 3, a socket portion of the hand set attaching part and a clamping strap being shown in elevation; and FIGURE 5 is a section on the line 5—5 of FIGURE 4.

In its general nature, the preferred embodiment shown as being illustrative of the invention includes a shoulder rest part generally designated SR, and a hand set attaching part generally designated AP carried by the shoulder rest part SR and being formed and constructed to be secured to a telephone hand set instrument generally designated T. By virtue of the construction described below for mounting the attaching part AP on the shoulder rest part SR, the attaching part may be adjusted forwardly and rearwardly, and preferably also upwardly and downwardly with respect to the shoulder rest part SR and, in consequence, with respect to the user's shoulder. The attaching part AP may also be reversed, that is rotated or turned through 180° with respect to the shoulder rest part SR so as to condition the complete supporting structure for right or left shoulder use.

In its more detailed nature, the shoulder rest part SR is formed, for example as a die molded plastic element generally angular as viewed in side elevation as in FIGURE 3, and comprising a top part 1 and a front part 2 connected by a curved part 3. Preferably, the top part 1 is somewhat longer than the front part 2, this relation having been found to enhance easy and comfortable supporting and extending fore-and-aft of the user's shoulder. A strip 4 of rubber or like cushioning material as affixed to the inner faces of the shoulder rest parts 1, 2 and 3 for promoting comfort, and also for preventing the shoulder rest part SR from slipping off of the user's shoulder.

Fast with and extending fore-and-aft of the shoulder rest part SR is a mounting bar MB, preferably cast or molded integrally with the part SR and extending fore-and-aft of the part SR, and preferably also upwardly and downwardly so as to be at an inclination as shown most clearly in FIGURE 3. The mounting bar MB is spaced outwardly somewhat from the shoulder rest part SR, the juncture of the parts MB and SR being provided by a connecting portion or web 5, preferably formed integrally with both parts SR and MB. The bar MB extends both forwardly and rearwardly and also both upwardly and downwardly of the connecting web 5 so as to enable the attaching part AP to have a wide range of fore-and-aft and up-and-down adjustment to suit the particular user.

Referring particularly to FIGURE 4, the hand set attaching part AP, also preferably formed as a die molding, comprises a socket portion generally designated 6 shaped to receive the midportion of the most commonly used telephone hand set instruments, and a clamping strap 7, for example of sheet metal, for holding the telephone instrument seated in the socket 6. For enabling a telephone instrument readily to be inserted into the socket 6 or removed for being reversed for right or left shoulder use, the clamping strap 7 is releasably secured to the socket portion by a screw 8 extending through a slot 9 in and disposed longitudinally with respect to the strap 7, and a screw 10 extending through a bayonet type slot 11 in the strap 7. Preferably, the screws 8 and 10 have threaded engagement with nuts 12, 12 inserted into slots formed in the socket portion 6 in the manner disclosed in my aforesaid Patent 2,863,954, this arrangement having proven to be economical in production and to provide a durable and lasting construction, the threads in the nuts 12 being less likely to be stripped or become worn than would be threads formed in the molded plastic socket part 6 itself.

In attaching a telephone hand set instrument T to the attaching part AP, the screws 8 and 10 are loosened, the strap 7 is pivoted slightly about the screw 8, and the enlarged part of the bayonet slot 11 is pulled over the head of the screw 10, thus enabling the strap 7 to be swung aside so as to permit insertion of the instrument T into the socket 6. The strap 7 is then swung back so as to overlie the seated part of the instrument T, and the smaller part of the bayonet slot 11 is engaged under the head of the screw 10, both screws 8 and 10 then being tightened to effect a firm assembly. The attachment of the instrument T to the attaching part AP is effected in this manner without completely disconnecting the clamping strap 7 from the socket portion 6, so that there is no danger of annoying accidental dropping of any of the parts when assemblying the instrument and the attaching part AP.

The attaching part AP further includes a projection 13 which is bifurcated as by a slit 14 so as to provide a pair of opposed fingers 15, 15 adapted to fit respectively against and frictionally engage opposed faces of the mounting bar MB. The fingers 15, 15 are formed respectively with guide lugs 16, 16 which underlie the mounting bar MB and extend towards one another so as to prevent displacement of the attaching part AP laterally from the mounting bar MB, but nevertheless so as to permit fore-and-aft and upward and downward sliding adjustment of the attaching part AP on the mounting bar MB and thus with respect to the shoulder rest part SR, considered in its entirety. The connecting web 5 at the juncture of the mounting bar MB and the shoulder rest 1, 2, 3 is more narrow, transversely of the shoulder rest part SR, than the distance between the guide lugs 16, 16, thus enabling the attaching part AP to be slid past the juncture of the mounting bar MG and the shoulder rest 1, 2, 3 to adjusted positions both in front of and to the rear of, and also above and below the connecting web 5. Consequently, a wide range of adjustment for adapting the construction for use by persons having different physiques and head position preferences is possible.

In order to secure the attaching part AP in adjusted position on the bar MB, a clamping screw 17 extends through the bifurcations of the projection 13, the head of the screw being recessed in a depression 18 and the opposite end of the screw engaging a nut 19 positioned in a slot 20. Tightening of the screw and nut clamping means 18, 19 will draw the fingers 15, 15 towards one another and into clamping engagement with the opposed faces of the bar MB for locking the attaching part AP in its adjusted position. Resilience of the fingers 15, 15 is enhanced by an enlarged transverse opening 21 at the root of the slit 14.

It is desirable that the attaching part AP, although being bodily adjustable lengthwise on the bar MB, be prevented from rotating about the bar during adjustment along the bar as well as after having been clamped to the bar. It is also desirable that the attaching part AP be mountable selectively in either of two positions on the mounting bar MB, displaced 180° from each other, for adapting the assembly for right or left shoulder use. Accordingly, the bar MB is formed so as to be non-circular and symmetrical in cross section and the fingers 15, 15 are similarly formed. In the illustrated construction, the bar MB is rectangular in cross section, and, so as to permit only two relative angular positions of the attaching part AP on the bar MB, the latter is longer in one cross sectional dimension than the other.

If it be desired to change the assembly from that shown in FIGURE 1 for left shoulder use to that shown in FIGURE 2 for right shoulder use, the screw 17 is loosened, the attaching part AP is slid off of the upper and rear end of the mounting bar MB and is turned through 180° to the position shown in FIGURE 2, and is then slid back onto the mounting bar MB in its reversed position. Either before or after the reversing of the attaching part AP on the bar MB, the clamping strap 7 is released and the instrument T is turned end-to-end and reseated and clamped in the socket 6. The attaching part AP is then slid along the mounting bar MB to the position found most comfortable by the particular right shoulder user, and the fingers 15, 15 are then drawn together to clamp the attaching part AP on the bar MB.

In the event the user might inadvertently fail to tighten the clamping screw 17, there would be a tendency for the attaching part AP to slide downwardly on the bar MB and off of the lower end of the latter, permitting the telephone instrument T to be dropped. For preventing such occurrences, the lower end of the bar MB, remote from the web 5, is provided with lateral projections or lugs 22 which extend outwardly far enough to be engaged by the fingers 15, 15 at the most relaxed or laterally extended positions of the latter so as to prevent lengthwise displacement of the attaching part AP from the mounting bar MB. The other, i.e. rear or top end of the bar MB is, however, free of lateral projections, thus enabling the part AP to slide off of this end when the part AP is to be reversed for right or left shoulder use.

The construction shown and described is preferred, but it is intended that the disclosure be illustrative rather than definitive, the invention being defined in the claims.

I claim:

1. In a telephone hand set support, a shoulder rest part adapted to rest on a user's shoulder to extend fore-and-aft thereof and having a mounting bar fast with said shoulder rest part and extending generally fore-and-aft therewith; a hand set attaching part having means slidably mounted on said mounting bar for enabling said attaching part to be bodily adjusted lengthwise of said mounting bar and for preventing rotation of said attaching part about said mounting bar during adjustment of said attaching part along said mounting bar; and means for securing said slidably mounted means in adjusted position on said mounting bar.

2. In a telephone hand set support, a shoulder rest part adapted to rest on a user's shoulder to extend fore-and-aft thereof and having a mounting bar integrally connected to said shoulder rest part and extending generally fore-and-aft therewith; a hand set attaching part having means slidably mounted on said mounting bar for enabling said attaching part to be bodily adjusted lengthwise of said mounting bar and for preventing rotation of said attaching part about said mounting bar during adjustment of said attaching part along said mounting bar; and means for securing said slidably mounted means in adjusted position on said mounting bar.

3. In a telephone hand set support, a shoulder rest part adapted to rest on a user's shoulder to extend fore-and-aft thereof and having a mounting bar integrally connected to said shoulder rest part and extending both forwardly and rearwardly of the connection of said mounting bar to said shoulder rest part; a hand set attaching part having means slidably mounted on said mounting bar for enabling said attaching part to be bodily adjusted lengthwise of said mounting bar and for preventing rotation of said attaching part about said mounting bar during adjustment of said attaching part along said mounting bar; and means for securing said slidably mounted means in adjusted position on said mounting bar.

4. In a telephone hand set support, a shoulder rest part adapted to rest on a user's shoulder to extend fore-and-aft thereof and having a mounting bar fast with said shoulder rest part and extending generally fore-and-aft therewith; a hand set attaching part having a pair of clamping fingers engaging opposed faces of said mounting bar for slidably mounting said attaching part on said mounting bar for enabling said attaching part to be bodily adjusted lengthwise of said mounting bar; and means for drawing said clamping fingers against the opposed faces of said mounting bar for securing said slidably mounted means in adjusted position on said mounting bar.

5. In a telephone hand set support, a shoulder rest part adapted to rest on a user's shoulder to extend fore-and-aft thereof and having a mounting bar fast with said shoulder rest part and extending generally fore-and-aft therewith and having an end remote from the juncture of said mounting bar and said shoulder rest part; a lateral projection on said mounting bar at said end thereof; a hand set attaching part having means slidably mounted on said mounting bar for enabling said attaching part to be bodily adjusted lengthwise of said mounting bar and for preventing rotation of said attaching part about said mounting bar during adjustment of said attaching part along said mounting bar, said lateral projection being engageable by said slidably mounted means for preventing displacement of said attaching part lengthwise of and from said mounting bar at said end of the latter; and means for securing said slidably mounted means in adjusted position on said mounting bar.

6. In a telephone hand set support, a shoulder rest part adapted to rest on a user's shoulder to extend fore-and-aft thereof and having a mounting bar fast with said shoulder rest part and extending both forwardly and rearwardly of the juncture of said mounting bar and said shoulder rest part, both ends of said mounting bar being remote from the juncture of said mounting bar and said shoulder rest part; a lateral projection on said mounting bar at one end thereof, the other end of said mounting bar being free of lateral projection; a hand set attaching part having means slidably mounted on said mounting bar for enabling said attaching part to be bodily adjusted lengthwise of said mounting bar and for preventing rotation of said attaching part about said mounting bar during adjustment of said attaching part along said mounting bar, said lateral projection being engageable by said slidably mounted means for preventing displacement of said attaching part lengthwise of and from said mounting bar at said one end thereof, said attaching part being displaceable lengthwise from said mounting bar at said other end thereof; and means for securing said slidably mounted means in adjusted position on said mounting bar.

7. In a telephone hand set support, a shoulder rest part adapted to rest on a user's shoulder to extend fore-and-aft thereof and having a mounting bar fast with said shoulder rest part, extending both forwardly and rearwardly of the juncture of said mounting bar and said shoulder rest part and being of symmetrical cross section, both ends of said mounting bar being remote from the juncture of said mounting bar and said shoulder rest part; a lateral projection on said mounting bar at one end thereof, the other end of said mounting bar being free of lateral projection; a hand set attaching part having means symmetrical in cross section similarly to said mounting bar slidably mounted on said mounting bar for enabling said attaching part to be bodily adjusted lengthwise of said mounting bar and for preventing rotation of said attaching part about said mounting bar, said lateral projection being engageable by said slidably mounted means for preventing displacement of said attaching part lengthwise of and from said mounting bar at said one end thereof, said attaching part being displaceable lengthwise from said mounting bar at said other end only thereof for enabling rotation of said attaching part 180° and re-mounting of said attaching part on said mounting bar, whereby to enable selective mounting of said attaching part on said mounting bar in either of two positions, one for right shoulder support and the other for left shoulder support; and means for securing said slidably mounted means on said mounting bar in lengthwise adjusted and selected right or left shoulder position.

8. In a telephone hand set support, a shoulder rest part adapted to rest on a user's shoulder to extend fore-and-aft thereof and having a mounting bar fast with said shoulder rest part, extending both forwardly and rearwardly of the juncture of said mounting bar and said shoulder rest part and being of generally rectangular cross section, both ends of said mounting bar being remote from the juncture of said mounting bar and said shoulder rest part; a lateral projection on the forward end of said mounting bar, the rearward end of said mounting bar being free of lateral projection; a hand set attaching part having means generally rectangular in cross section similarly to said mounting bar slidably mounted on said mounting bar for enabling said attaching part to be bodily adjusted lengthwise of said mounting bar and for preventing rotation of said attaching part about said mounting bar, said lateral projection being engageable by said slidably mounted means for preventing displacement of said attaching part lengthwise of and from said mounting bar at said forward end thereof, said attaching part being displaceable lengthwise from said mounting bar at said rearward end only thereof for enabling rotation of said attaching part 180° and re-mounting of said attaching part on said mounting bar, whereby to enable selective mounting of said attaching part on said mounting bar in either of two positions, one for right shoulder support and the other for left shoulder support; and means for securing said slidably mounted means on said mounting bar in lengthwise adjusted and selected right or left shoulder position.

9. In a telephone hand set support, a shoulder rest part adapted to rest on a user's shoulder to extend fore-and-aft thereof and having a mounting bar fast with said shoulder rest part, extending both forwardly and rearwardly of the juncture of said mounting bar and said shoulder rest part and being of generally rectangular cross section and greater in one cross sectional dimension than the other, both ends of said mounting bar being remote from the juncture of said mounting bar and said shoulder rest part; a lateral projection on the forward end of said mounting bar, the rearward end of said mounting bar being free of lateral projection; a hand set attaching part having means generally rectangular in cross section similarly to said mounting bar slidably mounted on said mounting bar for enabling said attaching part to be bodily adjusted lengthwise of said mounting bar and for preventing rotation of said attaching part about said mounting bar, said lateral projection being engageable by said slidably mounted means for preventing displacement of said attaching part lengthwise of and from said mounting bar at said forward end thereof, said attaching part being displaceable lengthwise from said mounting bar at said rearward end only thereof for enabling rotation of said attaching part 180° and re-mounting of said attaching part on said mounting bar, whereby to enable selective mounting of said attaching part on said mounting bar in either of two positions, one for right shoulder support and the other for left shoulder support; and means for securing said slidably mounted means on said mounting bar in lengthwise adjusted and selected right or left shoulder position.

10. Telephone hand set support structure according to claim 9 in which said slidably mounted means comprises a bifurcated extension of said attaching part providing two clamping fingers frictionally engageable respectively with opposed faces of said mounting bar.

11. Telephone hand set support structure according to claim 10 in which the means for securing said slidably mounted means in adjusted position comprises a clamping screw.

12. Telephone hand set support structure according to claim 10 in which said clamping fingers are provided with guide lugs underlying said mounting bar for preventing lateral displacement of said attaching part from said mounting bar.

13. Telephone hand set support structure according to claim 12 in which there is a connecting part at the juncture of said shoulder rest part and said mounting bar, said connecting part being narrower transversely of said shoulder rest part and said mounting bar than the transverse distance between said guide lugs, whereby said guide lugs can be slid along said mounting bar from said forward end thereof past said connecting part to the rearward end of said mounting bar, and vice versa.

No references cited.